United States Patent
Appietto et al.

(10) Patent No.: US 12,328,572 B2
(45) Date of Patent: Jun. 10, 2025

(54) DIGITAL KEY DERIVATION DISTRIBUTION BETWEEN A SECURE ELEMENT AND ULTRA-WIDE BAND MODULE

(71) Applicant: QUALCOMM Incorporated, San Diego, CA (US)

(72) Inventors: Pierre-Francois Appietto, Chateauneuf-le-Rouge (FR); Charles Nung Lo, San Diego, CA (US); Brian A. Redding, Urbana, IL (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 17/238,570

(22) Filed: Apr. 23, 2021

(65) Prior Publication Data

US 2022/0078609 A1    Mar. 10, 2022

Related U.S. Application Data

(60) Provisional application No. 63/075,254, filed on Sep. 7, 2020.

(51) Int. Cl.
*H04L 29/06* (2006.01)
*H04W 12/03* (2021.01)
(Continued)

(52) U.S. Cl.
CPC ......... *H04W 12/041* (2021.01); *H04W 12/03* (2021.01); *H04W 12/06* (2013.01); *H04W 76/10* (2018.02); *H04W 4/80* (2018.02)

(58) Field of Classification Search
CPC ... H04W 12/041; H04W 12/03; H04W 12/06; H04W 76/10; H04W 4/80; H04L 63/0492
See application file for complete search history.

(56) References Cited

U.S. PATENT DOCUMENTS

2019/0116619 A1* 4/2019 Hauck ................. H04L 63/0869
2020/0334355 A1* 10/2020 Klein ....................... G06F 21/62
(Continued)

FOREIGN PATENT DOCUMENTS

CN    111095963 A    5/2020
EP    3681046 A1    7/2020
(Continued)

OTHER PUBLICATIONS

International Search Report and Written Opinion—PCT/US2021/047781—ISA/EPO—Dec. 2, 2021.
SCP TEC: "CR 102 622 Rel-16 Addition of UWB Support", ETSI TC SCP TEC 88, ETSI Draft SCPTEC(20)000086R6, European Telecommunications Standards Institute (ETSI), 650, Route Des Lucioles, F-06921 Sophia-Antipolis, France, vol. WG SCP TEC SCP-TEC Nov. 13, 2020 (Nov. 13, 2020), pp. 1-20, XP014384477, Retrieved from the Internet: URL: docbox.etsi.org/SCP/SCP-WG-T/05-CONTRIBUTIONS/2020/SCPTEC(20)000086r6_CR_102_622_Rel-16_Addition_of_UWB_support.doc [retrieved on Nov. 13, 2020].
(Continued)

*Primary Examiner* — Joseph P Hirl
*Assistant Examiner* — Chi D Nguy
(74) *Attorney, Agent, or Firm* — Patterson + Sheridan, L.L.P.

(57) ABSTRACT

Certain aspects of the present disclosure provide techniques for secure digital key derivation for a ranging session between a first device (e.g., a user equipment (UE)) and a second device (e.g., a vehicle). According to certain aspects, a first device maintains a secure ranging in a secure element (SE) at the first device. The first device further fetches, from the SE, one or more other keys derived from the secure ranging key. The first device further uses the one or more other keys to secure a ranging session between the first device and a second device.

27 Claims, 7 Drawing Sheets

(51) Int. Cl.
   *H04W 12/041* (2021.01)
   *H04W 12/06* (2021.01)
   *H04W 76/10* (2018.01)
   *H04W 4/80* (2018.01)

(56) References Cited

U.S. PATENT DOCUMENTS

2020/0336303 A1* 10/2020 Sierra ................. H04L 63/1475
2023/0262467 A1* 8/2023 Lee ....................... H04W 12/03
                                                            713/170

FOREIGN PATENT DOCUMENTS

| KR | 20220008616 | * | 7/2020 | ............ H04W 12/03 |
| WO | WO 2012/048206 | * | 10/2010 | ............ H04L 12/22 |
| WO | 2019110552 A1 | | 6/2019 | |

OTHER PUBLICATIONS

Stmicroelectronics: "Addition of UWB Support", ETSI TC SCP TEC 87, SCPTEC(20)000086R3_CR_102_622_REL-16_Addition_of_UWB_Support, European Telecommunications Standards Institute (ETSI), 650, Route Des Lucioles, F-06921 Sophia-Antipolis, France, vol. SCP-SCP-WG-T, Sep. 3, 2020 (Sep. 3, 2020), pp. 1-19, XP014385671 [retrieved on Sep. 3, 2020], Section XX.1, Sections XX.4.1 and XX.4.2, Sections XX.6.2.1-XX.6.2.3, Section XX.8.
Taiwan Search Report—TW110131845—TIPO—Mar. 11, 2025.

* cited by examiner

DIGITAL KEY DERIVATION DISTRIBUTION BETWEEN A SECURE ELEMENT AND ULTRA-WIDE BAND MODULE

PRIORITY CLAIM(S)

This application claims benefit of and priority to U.S. Provisional Application No. 63/075,254, filed on Sep. 7, 2020, which is expressly incorporated by reference in its entirety as if fully set forth below and for all applicable purposes.

BACKGROUND

Field of the Disclosure

Aspects of the present disclosure relate to wireless communications and more particularly, to secure digital key derivation for a ranging session between a user equipment (UE) and another device.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

In some cases, UEs may have components to support other types of communication that may allow them to interface with other devices such as a vehicle, for example, to perform a passive entry function. The passive entry function may be performed by using Bluetooth (e.g., Bluetooth low energy/BLE) and/or ultra-wideband (UWB) technology. Such UEs may ultimately eliminate the need for traditional keys.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved security for ranging sessions between wireless devices, such as between a user equipment (UE) and a vehicle or other locked device.

Certain aspects of the disclosure relate to a method for wireless communication by a first device. The method generally includes maintaining a secure ranging key in a secure element (SE) at the first device. The method generally includes fetching, from the SE, one or more other keys derived from the secure ranging key. The method generally includes using the one or more other keys to secure a ranging session between the first device and a second device.

Certain aspects of the present disclosure are directed to an apparatus for wireless communication by a UE. The apparatus generally includes a SE configured to maintain a secure ranging key, and derive one or more other keys from the secure ranging key. The apparatus generally includes at least one processor coupled with a memory and configured to fetch the one or more other keys from the SE, and use the one or more other keys to secure a ranging session between the apparatus and another device.

Certain aspects of the present disclosure are directed to an apparatus for wireless communication by a UE. The apparatus generally includes means for maintaining a secure ranging key in a SE at the apparatus. The apparatus generally includes means for fetching, from the SE, one or more other keys derived from the secure ranging key. The apparatus generally includes means for using the one or more other keys to secure a ranging session between the apparatus and another apparatus.

Certain aspects of the present disclosure are directed to a computer readable medium having instructions stored thereon for maintaining a secure ranging key in a SE at a first device. The computer readable medium further has instructions stored thereon for fetching, from the SE, one or more other keys derived from the secure ranging key. The computer readable medium further has instructions stored thereon for using the one or more other keys to secure a ranging session between the first device and a second device.

To the accomplishment of the foregoing and related ends, the one or more aspects comprise the features hereinafter fully described and particularly pointed out in the claims.

The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure, the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure relate to wireless communications, and more particularly, for secure digital key derivation for a ranging session between a first device (e.g., a user equipment (UE)) and a second device (e.g., a vehicle).

In a conventional ranging session, a secure ranging key, sometimes referred to herein as a base ranging secret key is generated in a secure element (SE). In some systems, the base ranging key is referred to as an ultra-wideband (UWB) ranging secret key (URSK). While aspects of the disclosure are described with respect an example of a URSK, the techniques herein may apply to any base ranging secret key. The base ranging secret key may be used to derive other keys, and may be considered a highly sensitive asset. For example, in a scenario where a UE replaces a conventional key (e.g., by deriving and using digital keys), by stealing only the base ranging secret key, then a paired access device (e.g., a vehicle) could be subsequently stolen. Unfortunately, the UWB module, essentially a radio chip, is not likely as secure as the SE. Thus, the base ranging secret key may be at risk of exposure.

Accordingly, aspects of the present disclosure provide techniques for distributing the derivation of digital keys between a SE module and an UWB module. For example, rather than the less secure UWB module fetching a secure ranging key, such as a base ranging secret key, the SE module can instead maintain the base ranging secret key and derive one or more other keys. The SE module can then fetched those other derived keys from the SE module. Thus, more keys would need to be stolen from the less secure UWB module in order to gain entry to a paired access device.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

Example Wireless Communications System

Figure 1:
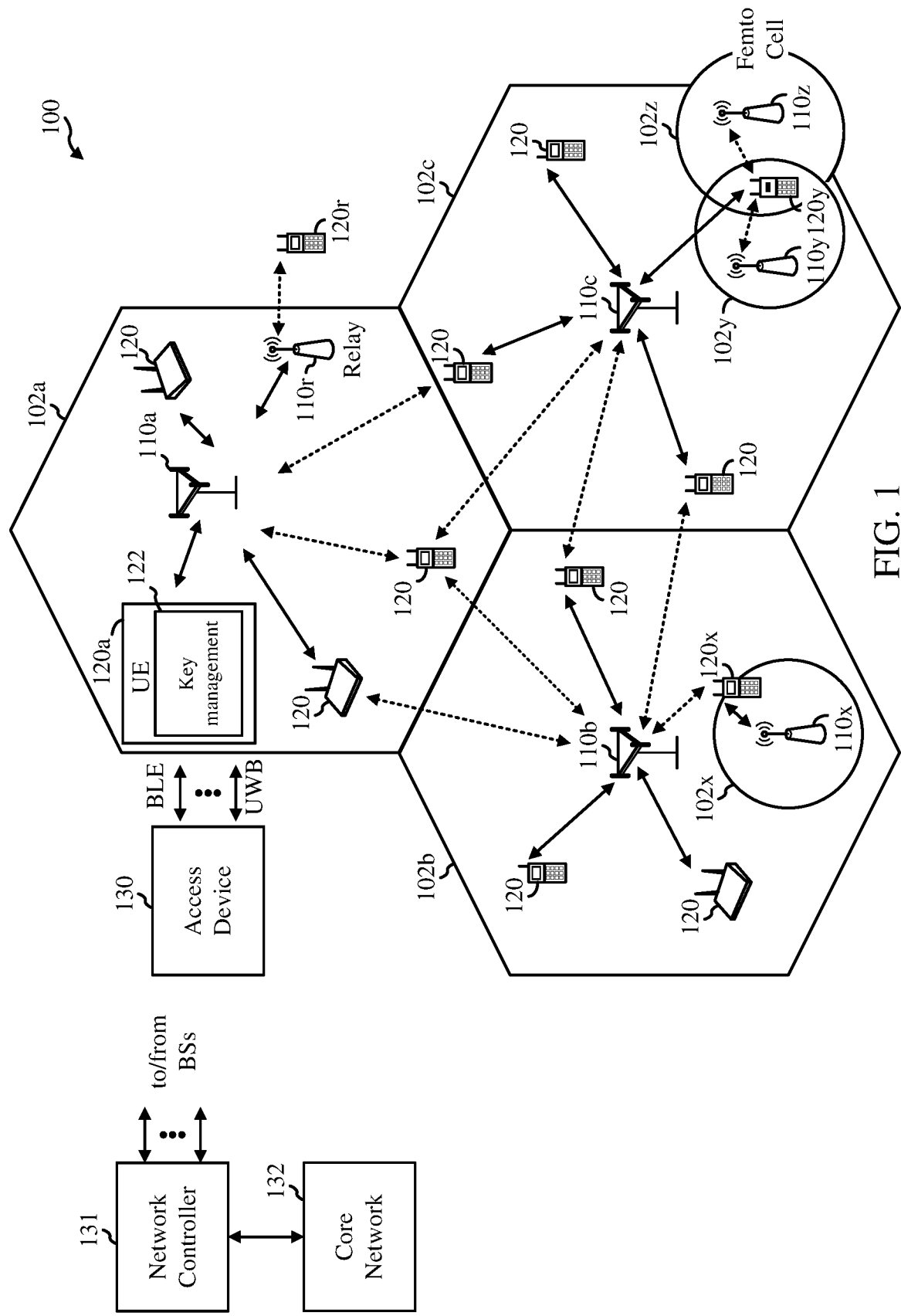
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, wireless communication network 100 may be an NR system (e.g., a 5G NR network). As shown in FIG. 1, wireless communication network 100 may be in communication with a core network 132. Core network 132 may in communication with one or more base station (BSs) 110a-z (each also individually referred to herein as BS 110 or collectively as BSs 110) and/or user equipment (UE) 120a-y (each also individually referred to herein as UE 120 or collectively as UEs 120) in wireless communication network 100 via one or more interfaces.

A BS 110 may provide communication coverage for a particular geographic area, sometimes referred to as a "cell", which may be stationary or may move according to the location of a mobile BS 110. In some examples, BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, BSs 110a, 110b, and 110c may be macro BSs for macro cells 102a, 102b and 102c, respectively. BS 110x may be a pico BS for a pico cell 102x. BSs 110y and 110z may be femto BSs for femto cells 102y and 102z, respectively. A BS may support one or multiple cells.

BSs 110 communicate with UEs 120a in the wireless communication network 100. UEs 120a (e.g., 120x, 120y, etc.) may be dispersed throughout wireless communication network 100, and each UE 120a may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., UE 120a or BS 110), or that relays transmissions between UEs 120a, to facilitate communication between devices.

A network controller 131 may be in communication with a set of BSs 110 and provide coordination and control for these BSs 110 (e.g., via a backhaul). In certain cases, network controller 131 may include a centralized unit (CU) and/or a distributed unit (DU), for example, in a 5G NR system. In aspects, network controller 131 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 4:
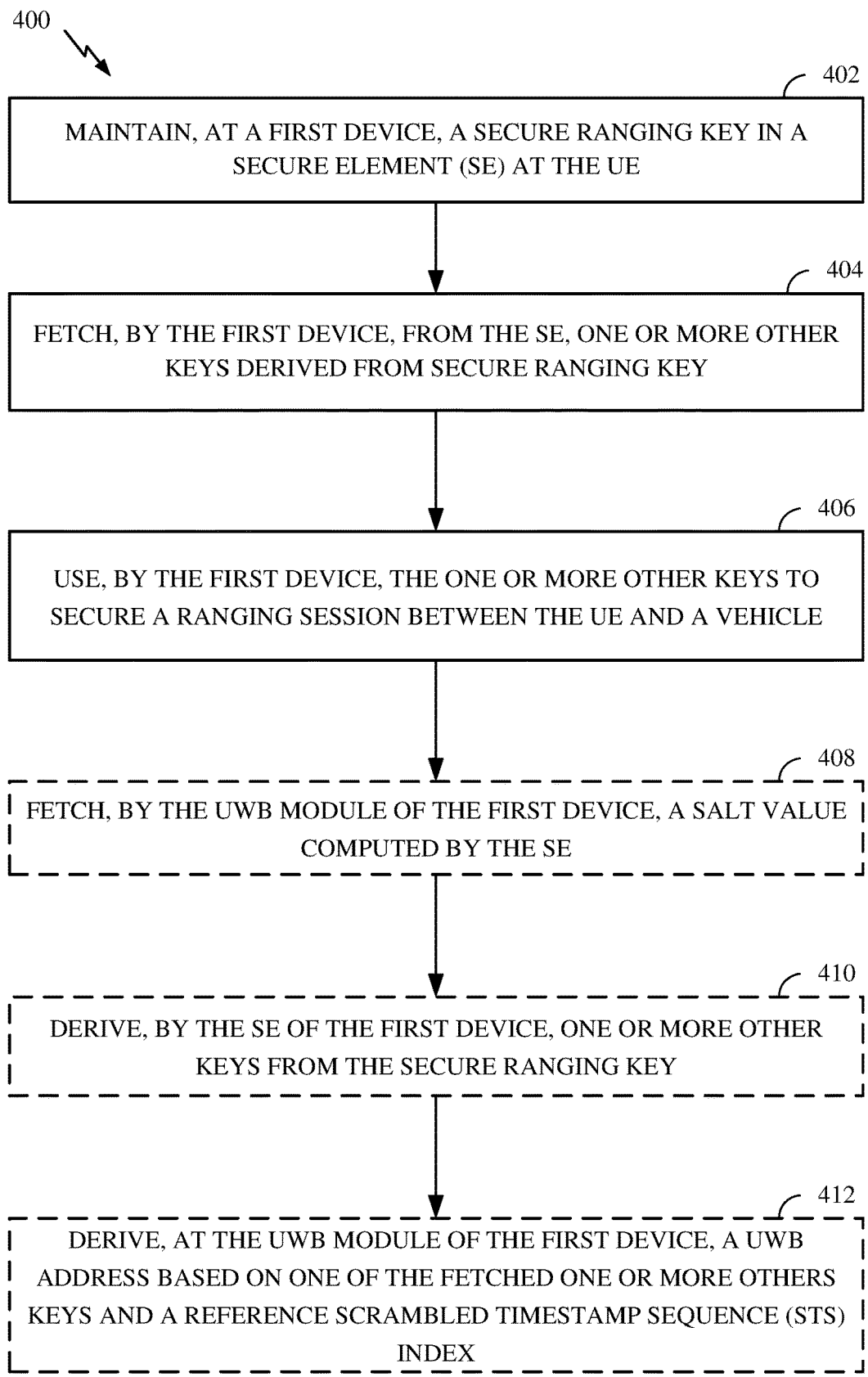
FIG. 4 illustrates example operations for wireless communication by a first device, in accordance with certain aspects of the present disclosure.

UE 120a in wireless communication network 100 may include a key management module 122 configured to perform (or cause UE 120a to perform) operations 400 of FIG. 4 to securely derive keys for a ranging session with an access device 130 (e.g., via Bluetooth low energy (BLE) and/or ultra-wideband (UWB) interfaces between UE 120a and access device 130, as shown in FIG. 1). In some cases, access device 130 may be a vehicle, a device within a building, and/or any access device with which UE 120a may enter a ranging session.

The UWB interface physical (PHY) layer uses a waveform based on an impulse radio signal using band-limited data pulses. The UWB PHY is primarily used for ranging (also referred to as range-based localization, which uses the distance/angle measured between two nodes to determine the position of one of the nodes) but may also be used for data communication. Enhanced ranging devices (ERDEVs) may employ mechanisms to enhance immunity to attack. One such mechanism is the inclusion of a scrambled timestamp sequence (STS) in the basic physical protocol data unit (PPDU) format. Flexibility in UWB PHY layer may be achieved by adaptation of parameters like SYNC preamble (a synchronization portion of the preamble) lengths, preamble codes, start frame delimiter (SFD) lengths/codes, pulse repetition frequencies (PRFs), and data rates. Certain PHY modes may be used for secure ranging, enhanced ranging devices (ERDEVs) on both sides of the link may pre-negotiate the specific parameters that are used for a secure ranging session. The negotiations of secure ranging parameters can be done at higher layers or using Bluetooth Low Energy (BLE) technology.

In a UWB ranging service, the ranging device roles are based on which device starts the ranging procedure and is responsible for setting the ranging exchange. An entity can start the UWB ranging packet exchange by sending a first UWB POLL packet. The entity that starts the UWB ranging is generally referred to as an "initiator". In the case of derived cipher key (DCK), this is the device (e.g., UE 120a). An entity that responds to a UWB POLL packet generally referred to as a "responder". An entity that includes a number of responders is called a "responder-device" (e.g., the vehicle). An initiator and a responder-device engaged in a continuous ranging procedure that is characterized by a specific set of parameters is called a ranging session.

Figure 2:
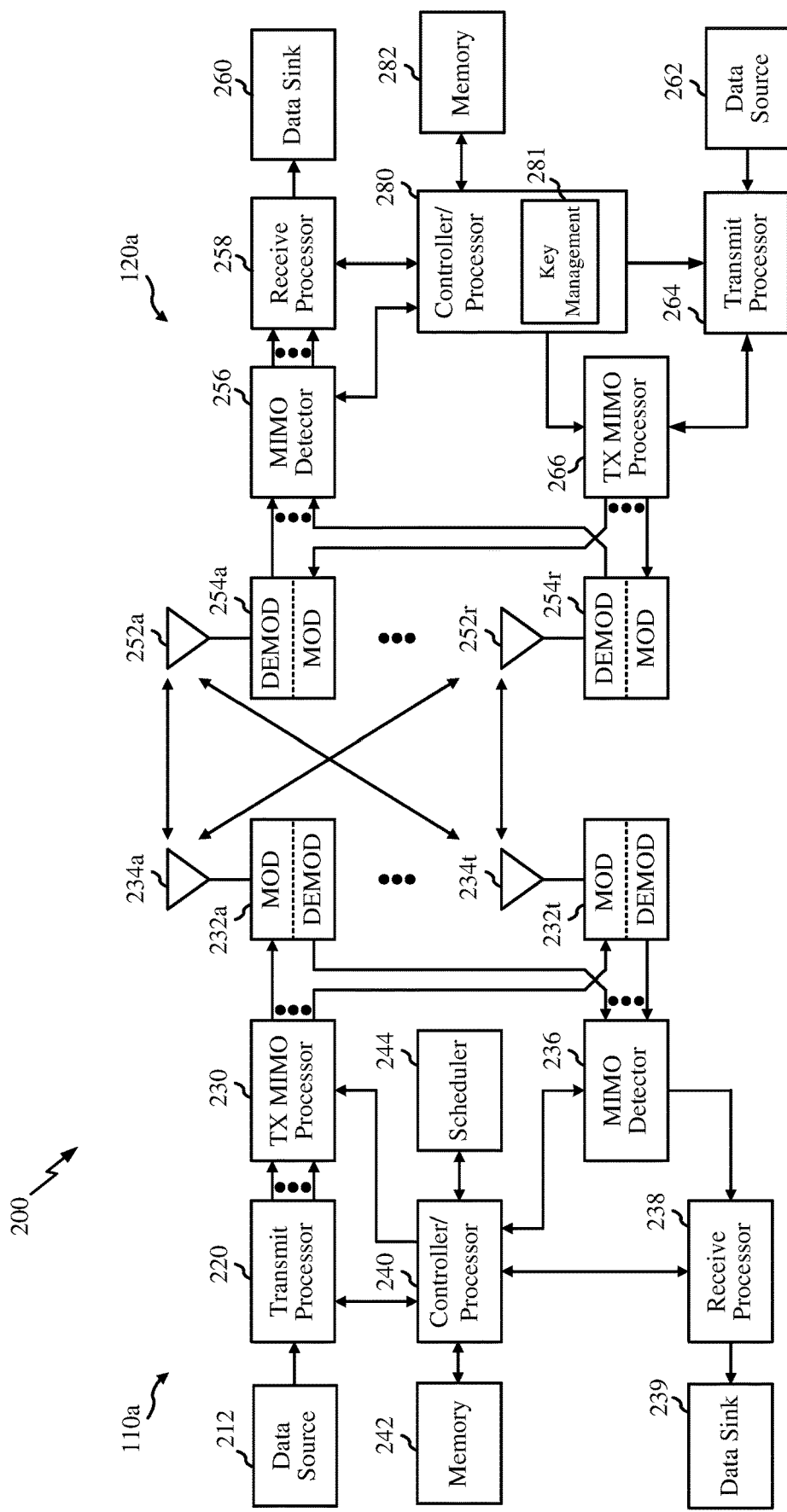
FIG. 2 is a block diagram conceptually illustrating a design of an example user equipment (UE) and a base station (BS), in accordance with certain aspects of the present disclosure.

FIG. 2 illustrates example components of BS 110 and UE 120a (as depicted in FIG. 1), which may be used to implement aspects of the present disclosure. For example, antennas 252, processors 266, 258, 264, and/or the key management module 281 of controller/processor 280 of UE 120a may be configured (or used) to perform operations 400 of FIG. 4.

At BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Transmit processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 120a, antennas 252a-252r may receive the downlink signals from BS 110 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from controller/processor 280. Transmit processor 264 may also generate reference symbols for a reference signal (e.g., for the sounding reference signal (SRS)). The symbols from transmit processor 264 may be precoded by a TX MIMO processor 266 if applicable, further processed by the modulators in transceivers 254a-254r (e.g., for SC-FDM, etc.), and transmitted to BS 110. At BS 110, the uplink signals from UE 120a may be received by antennas 234, processed by the demodulators in transceivers 232a-232t, detected by a MIMO detector 236 if applicable, and further processed by a receive processor 238 to obtain decoded data and control information sent by UE 120a. Receive processor 238 may provide the decoded data to a data sink 239 and the decoded control information to controller/processor 240.

Memories 242 and 282 may store data and program codes for BS 110 and UE 120a, respectively. A scheduler 244 may schedule UEs for data transmission on the downlink and/or uplink.

Antennas 252, processors 266, 258, 264, and/or controller/processor 280 of UE 120a and/or antennas 234, processors 220, 230, 238, and/or controller/processor 240 of BS 110 may be used to perform the various techniques and methods described herein. For example, as shown in FIG. 2, controller/processor 280 of UE 120a has a key management module 281 that securely derives keys for a ranging session with an access device, according to aspects described herein. Although shown at the controller/processor, other components of UE 120a and BS 110 may be used to perform the operations described herein.

Example Digital Key Derivation for Secure Ranging

Aspects of the present disclosure relate to secure digital key derivation for a ranging session between a first device and a second device. For example, an authenticated link can be established between the first device and the second device, such as between a user equipment and an access device (e.g., such as UE 120a and access device 130 in wireless communication network 100 of FIG. 1).

Figure 3:
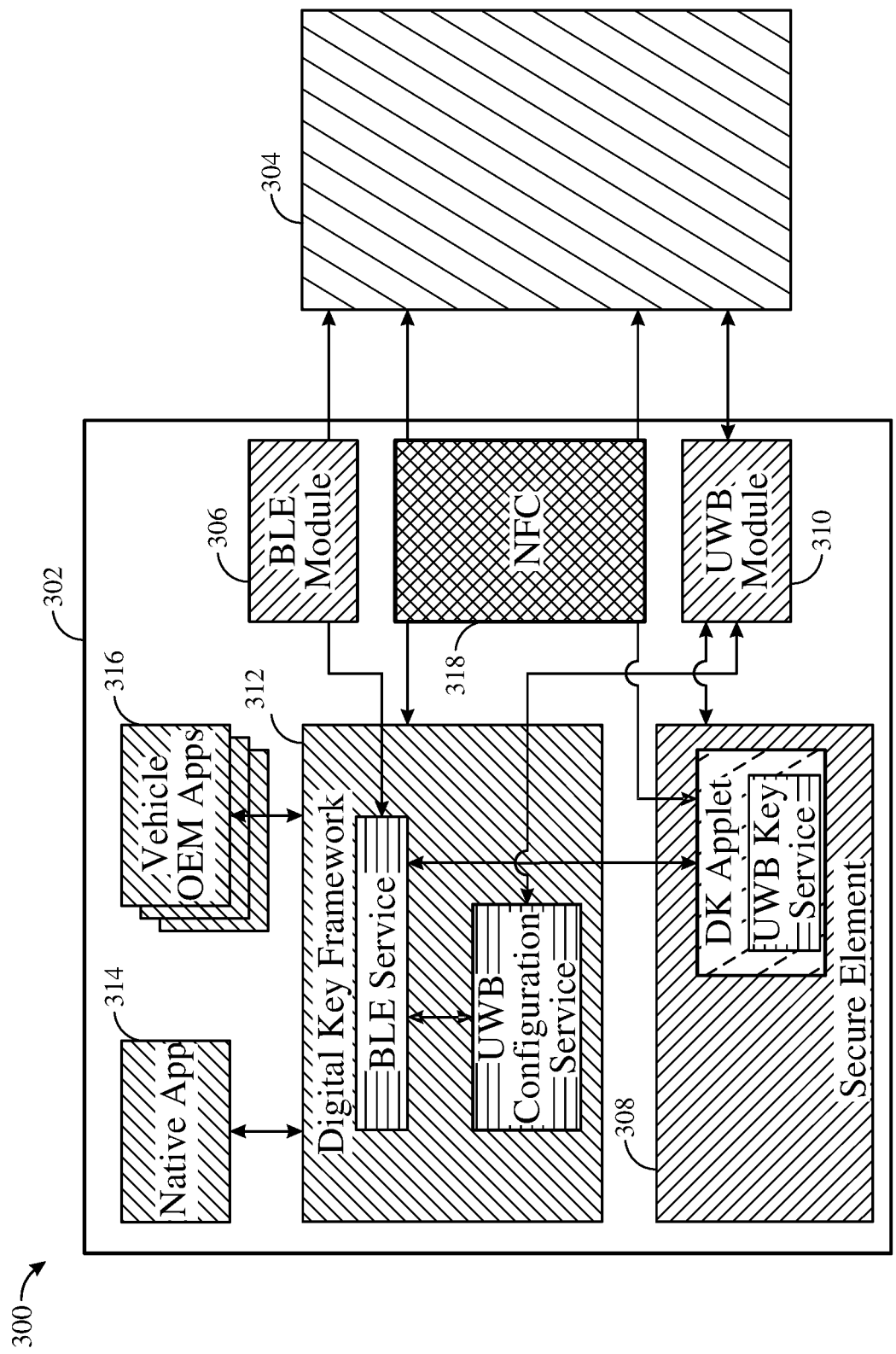
FIG. 3 is a block diagram conceptually illustrating an example architecture for digital key management, in accordance with certain aspects of the present disclosure.

FIG. 3 illustrates an example architecture 300 that may provide a framework to discover, manage, and control ranging (e.g., ultra-wideband (UWB)-based ranging) between a first device 302 and a second device 304. Example architecture 300 may provide for management of digital keys to achieve secure data exchange between first device 302 and second device 304.

As illustrated in FIG. 3, first device 302 includes a Bluetooth low energy (BLE) module 306, a secure element (SE) module 308, and a UWB module 310. Each of these modules may consist of one or more integrated circuits (ICs) or may be part of a combination (single) chip solution.

In a digital key use case, once first device 302 is paired with second device 304, UWB module 310, BLE module 306, and SE module 308 may replace (or function as) a conventional car key and/or key fob.

BLE module 306 is an entity within first device 302 that manages Bluetooth communication between first device 302 and second device 304. In some cases, any suitable module that can facilitate low energy communication between first device 302 and second device 304 may be implemented within first device 302.

UWB module 310 is an entity within first device 302 that manages the UWB ranging session. UWB module 310 may be used for fine location determination.

SE module 308 is an entity within first device 302 that may enable mutual authentication and data sharing over a secure channel with second device 304. SE module 308 may be used to store a sensitive key, which may also be referred to as a secure ranging key, a base ranging secret key, and/or a UWB Ranging Secret Key (URSK), sometimes also referred to as a UWB Ranging Session Key. As will be described in greater detail below, this key stored at SE module 308 may be used as a "base key" from which various other keys are derived that are used to encrypt different messages exchanged between the car and the device through UWB.

In a conventional ranging session, the URSK is generated in SE module 308. The URSK is then fetched by UWB module 310 from SE module 308. Once the URSK is fetched by UWB module 310, the URSK to be considered active and, once active, the URSK has a maximum lifetime ("Time-to-Live"). For example, a URSK maximum lifetime may be 12 hours.

As will be described in more detail below, the URSK may be used to derive other keys. In some systems, UWB module 310 derives other keys using the fetched URSK. The URSK may be considered a highly sensitive asset in the architecture shown in FIG. 3. For example, in a scenario where a UE replaces a conventional key (e.g., by deriving and using digital keys), by stealing only the URSK is stolen, then a paired access device (e.g., a vehicle) could be stolen. Unfortunately, the UWB module, essentially a radio chip, is not likely as secure as the SE. Thus, the URSK may be at risk of exposure.

Example Digital Key Derivation Distribution Between Secure Element and UWB

Aspects of the present disclosure provide techniques for distributing the derivation of digital keys between a secure element (SE) module (such as SE module 308) and an ultra-wideband (UWB) module (such as UWB module 310). For example, rather than the less secure UWB module fetching a secure ranging key, such as a secure ranging key or base ranging secret key. As described above, one example of a base ranging secret may be a UWB ranging secret key (URSK). The SE module can maintain the base ranging secret key and derive one or more other keys. The SE module can then fetch those other derived keys from the SE module. Thus, more keys would need to be stolen from the less secure UWB module in order to gain entry to a paired access device.

Referring to the architecture of FIG. 3, SE module 308 may include or correspond to an installed Digital Key (DK) Applet. SE module 308 may perform cryptographic operations which can be done without information coming from UWB module 310 (as will be highlighted and explained below with reference to FIG. 5). As shown, SE module 308 may be in communication with a digital key framework module 312, which may include a BLE service module and a UWB configuration service module. Digital key framework module 312 may be in communication with a native application 314 and one or more vehicle original equipment manufacturer (OEM) applications 316. Additionally, as shown, first device 302 may include a near-field communication (NFC) module 318 configured to facilitate wireless communication with second device 304.

FIG. 4 illustrates example operations 400 for wireless communication by a first device. For example, operations 400 may be performed by a UE (such as UE 120a of FIG. 1 and/or FIG. 2) to participate in a secure ranging session with a second device (e.g., a vehicle), in accordance with certain aspects of the present disclosure. In some cases, an access device may perform the same or similar operations to securely handle the base ranging secure key on its end. Operations 400 may be implemented as software components that are executed and run on one or more processors (e.g., controller/processor 280 of FIG. 2). Further, the transmission and reception of signals by the first device in operations 400 may be enabled, for example, by one or more antennas (e.g., antennas 252 of FIG. 2). In certain aspects, the transmission and/or reception of signals by the first device may be implemented via a bus interface of one or more processors (e.g., controller/processor 280) obtaining and/or outputting signals.

Operations 400 begin, at 402, by maintaining a secure ranging key in a SE at the first device. For example, a URSK may be maintained/kept in the SE of the first device.

At 404, the first device fetches, from the SE, one or more other keys derived from the secure ranging key. For example, the one or more other keys may be keys used to establish an authenticated link between the first device and a second device (e.g., an access device, such as a vehicle).

At 406, the first device uses the one or more other keys to secure a ranging session between the first device and a second device. For example, the first device 302 and the second device 304 may enter a ranging session based on one or more other keys derived from the secure ranging key.

In some cases, the first device, at 408, optionally fetches, by the UWB module of the first device, a salt value computed by the SE. In certain aspects, the first device may further calculate a salted hash key based on the fetched salt value. A salt can be random data that is used as an additional input to a one-way function that hashes data, a password or passphrase. Salts are used to safeguard passwords in storage. A cryptographic salt is made up of random bits added to each password instance before its hashing. Salts create unique passwords even in the instance of two users choosing the same passwords. Salts may help attacks by forcing attackers to re-compute them using the salts.

In some cases, the first device, at 410, optionally derives, by the SE of the first device, one or more other keys from the secure ranging key. In some cases, the optional derivation of the one or more other keys may be facilitated by one or more key derivation functions (KDFs).

In some cases, the first device, at 412, optionally derives, at the UWB module of the first device, a UWB address based on one of the fetched one or more others keys and a reference scrambled timestamp sequence (STS) index.

As noted above, the URSK (e.g., the secure ranging key) may be used to derive multiple keys used by a UE (e.g., the first device) to secure the ranging session with a vehicle (e.g., the second device). Rather than the UWB module fetching the URSK and deriving these keys as in a conventional system, these keys may be derived at the SE itself, allowing the URSK to be maintained at the SE and not be exposed.

Figure 5:
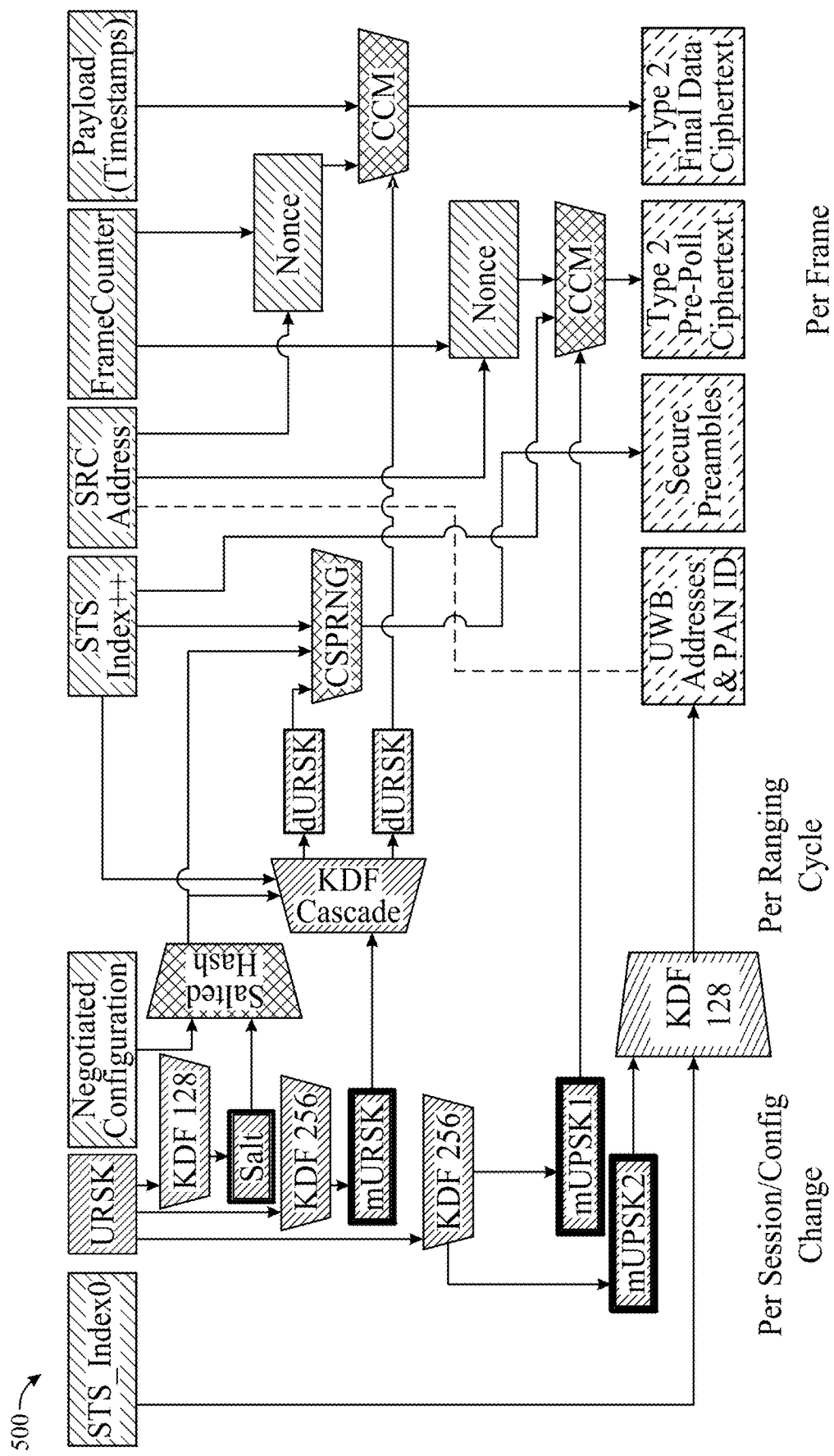
FIG. 5 is a block diagram conceptually illustrating a key derivation function, in accordance with certain aspects of the present disclosure.

FIG. 5 illustrates an example distribution of digital keys that may be derived, from a URSK, by the SE module and UWB module.

As shown in FIG. 5, the keys generally include keys that are derived per ranging session and/or per configuration change; keys that are derived per ranging cycle; and keys that are derived per frame. The URSK may be used to derive other keys, for example, by using KDFs involving the URSK. For example, using KDF 256, the URSK can be used to derive keys that remain static during a ranging session. Keys that remain static during a ranging session include a salt, an encryption key (e.g., sometimes referred to as mUPSK1) and an identity key (e.g., sometimes referred to as mUPSK2). The mUPSK1 may be used to secure the ranging payload. As shown in FIG. 5, the mUPSK2 may be used to derive the UWB addresses and a personal area network (PAN) ID (e.g., using the KDF 128). As shown in FIG. 5, the URSK may be used to derive a hashing key (e.g., a salt value using the KDF 128) and a seeding key (e.g., sometimes referred to as mURSK) for per ranging session cascading key derivations.

According to certain aspects, shown in the example of FIG. 5, after the (secure) ranging key (URSK) creation, the SE may compute the keys that remain static during the ranging section, such as the salt, mURSK, mUPSK1, and mUPSK2. Once the secure session is established, the UWB module may fetch the salt, mURSK, mUPSK1, and mUPSK2 from the SE (without exposing the URSK).

Based on a negotiated configuration and the salt (retrieved from the SE), the UWB module may calculate a salted hash key (e.g., using the fetched salt value, as shown in FIG. 5). The UWB module may also derive the UWB address, based on the mUPSK2 and a reference scrambled timestamp sequence (STS) index (e.g., a starting STS index, STS_Index0).

As illustrated in FIG. 5, using an STS index value when the ranging cycle starts, the salted hash, and the mURSK, the UWB module may compute a derived URSK (dURSK) and a derived UWB data secret key (dUDSK).

The UWB module may then encrypt each STS index (e.g., Type 2 Pre-poll) for each frame, using the mUPSK1 (e.g., through advanced encryption standard (AES) counter with a cipher block chaining message authentication code (CCM) algorithm) with a sequence (e.g., [Source Address|Frame counter|Nonce security level]) as a Nonce. The UWB module may also encrypt Type 2 timestamps per frame using the dUDSK (AES-CCM), again with a sequence (e.g., [Source Address|Frame counter|Nonce security level]) as a Nonce.

Figure 6:
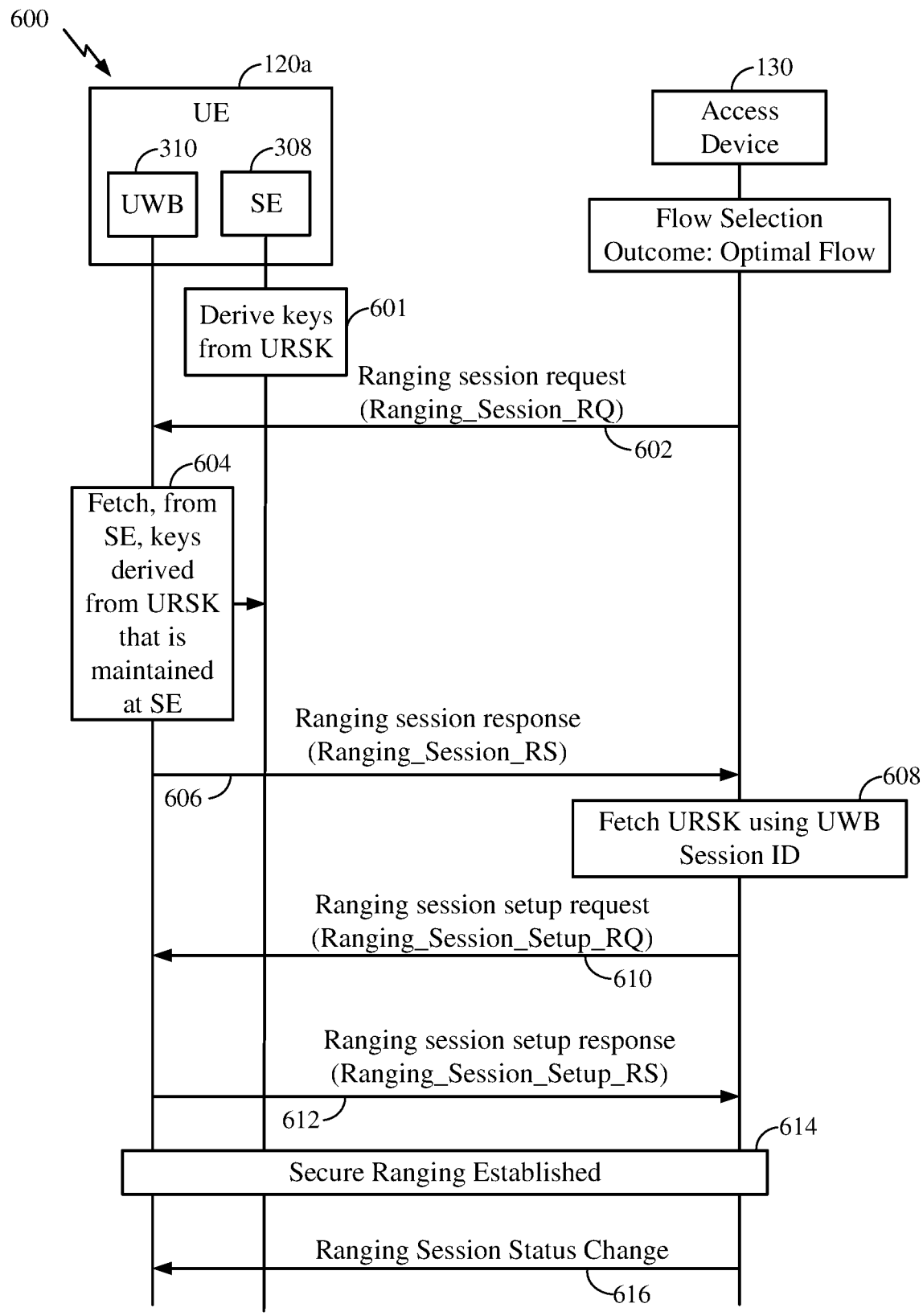
FIG. 6 illustrates an example secure ranging setup call flow diagram, in accordance with certain aspects of the present disclosure.

FIG. 6 illustrates an example secure ranging setup call flow diagram 600 for a secure setup of a ranging session between a first device (e.g., UE 120a of FIG. 1) and a second device (e.g., access device 130 of FIG. 1, which may be a vehicle). In the illustrated example, at 601, SE module 308 of the UE 120a derives one or more keys from the URSK, which may be maintained in the SE module 308. Access device 130, at 602, sends a ranging session request to the access device 130. Rather than fetch the URSK from the SE (as in the conventional approach), UE 120a fetches, at 604, keys derived from the URSK itself (e.g., while the URSK is maintained in the SE thereby avoiding exposure). UE 120a then sends a ranging session response, at 606) and access device 130, at 608, fetches URSK using the UWB Session ID provided to the device. In some cases, rather than fetch the URSK, the vehicle may similarly fetch keys derived from the URSK (e.g., also avoiding potential exposure of the URSK on the vehicle side). As shown at 610, 612, 614, and 616, UE 120a and access device 130 establish the secure ranging session using ranging session setup request/response signaling.

By maintaining the URSK at SE module 308, and avoiding URSK exposure, the techniques presented herein may help enhance the security model of various digital key use cases, such as UE-to-vehicle ranging sessions. As described herein, the URSK may never leave the SE, which may be considered the most secured entity in the architecture (e.g., having an evaluation assurance level (EAL) 5, at least).

Instead of storing the URSK for a time to live (TTL) duration (e.g., 12 hours maximum), the UWB module may only keep in memory keys derived from the URSK, and a salt value, with the same TTL. The area of potential attacks (the "attack surface") may therefore be smaller, as an attacker would have to retrieve all of the derived keys and a salt value, rather than the single key (URSK), in the same amount of time, thus providing improved security within the system from attackers.

Figure 7:
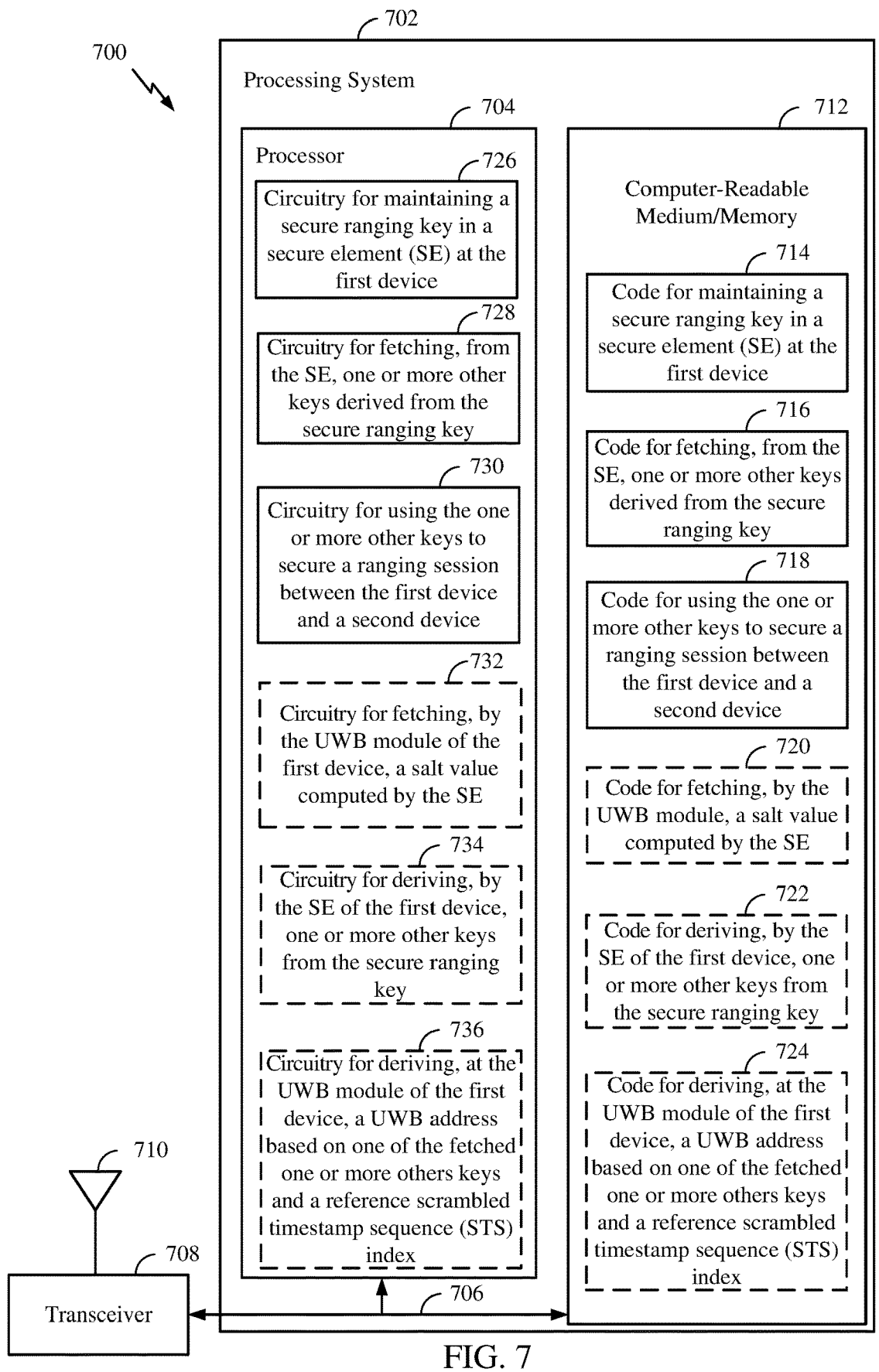
FIG. 7 illustrates a communications device that may include various components configured to perform operations for the techniques disclosed herein in accordance with aspects of the present disclosure.

FIG. 7 illustrates a communications device 700 that may include various components (e.g., corresponding to means-plus-function components) configured to perform operations for the techniques disclosed herein, such as operations 400 illustrated in FIG. 4. Communications device 700 includes a processing system 702 coupled to a transceiver 708. Transceiver 708 is configured to transmit and receive signals for communications device 700 via an antenna 710, such as the various signals as described herein. Processing system 702 may be configured to perform processing functions for communications device 700, including processing signals received and/or to be transmitted by communications device 700.

Processing system 702 includes a processor 704 coupled to a computer-readable medium/memory 712 via a bus 706. In certain aspects, computer-readable medium/memory 712 is configured to store instructions (e.g., computer-executable code) that when executed by processor 704, cause processor 704 to perform operations 400 illustrated in FIG. 4, or other operations for performing the various techniques discussed herein. In certain aspects, computer-readable medium/memory 712 stores code 714 for maintaining a secure ranging key in a SE at the first device; code 716 for fetching, from the SE, one or more other keys derived from the secure ranging key; code 718 for using the one or more other keys to secure a ranging session between the first device and a second device; optional code 720 for fetching a salt value computed by the SE; optional code 722 for deriving, by the SE of the first device, one or more other keys from the secure ranging key; and optional code 724 for deriving, at the UWB module of the first device, a UWB address based on one of the fetched one or more others keys and a reference scrambled timestamp sequence (STS) index. In certain aspects, processor 704 has circuitry configured to implement the code stored in computer-readable medium/memory 712. Processor 704 includes circuitry 726 for maintaining a secure ranging key in a SE at the first device; circuitry 728 for fetching, from the SE, one or more other keys derived from the secure ranging key; circuitry 730 for using the one or more other keys to secure a ranging session between the first device and a second device; optional circuitry 732 for fetching a salt value computed by the SE; optional code 734 for deriving, by the SE of the first device, one or more other keys from the secure ranging key; and optional code 736 for deriving, at the UWB module of the first device, a UWB address based on one of the fetched one or more others keys and a reference scrambled timestamp sequence (STS) index.

EXAMPLE ASPECTS

In addition to the various aspects described above, the aspects can be combined. Some specific combinations of aspects are detailed below:

Aspect 1: A method for wireless communications by a first device, comprising maintaining a secure ranging key in a secure element (SE) at the first device; fetching, from the SE, one or more other keys derived from the secure ranging key; and using the one or more other keys to secure a ranging session between the first device and a second device.

Aspect 2: The method of Aspect 1, wherein the first device comprises a user equipment (UE) and the second device comprises a vehicle.

Aspect 3: The method of any of Aspects 1 or 2, wherein the one or more other keys are used to establish an authenticated link between the first device and the second device.

Aspect 4: The method of Aspect 1, wherein the one or more other keys are fetched by an ultra-wideband (UWB) module that manages the ranging session for the first device.

Aspect 5: The method of Aspect 4, further comprising fetching, by the UWB module, a salt value computed by the SE; and calculating a salted hash key based on the salt value fetched from the SE.

Aspect 6: The method of any of Aspects 4 or 5, further comprising deriving, at the UWB module, a UWB address based on one of the fetched one or more others keys and a reference scrambled timestamp sequence (STS) index.

Aspect 7: The method of any of Aspects 4-6, further comprising using, at the UWB module, one of the fetched one or more other keys to encrypt a STS index included in each frame sent as part of the ranging session.

Aspect 8: The method of any of Aspects 5-7, further comprising fetching, from the SE, one or more new keys and a new salt for each new ranging session.

Aspect 9: The method of any of Aspects 1-8, wherein the fetched one or more other keys comprise at least one of an encryption key; an identity key; a hashing key; a seeding key; or a combination thereof.

Aspect 10: The method of Aspect 9, further comprising at least one of using the encryption key for securing ranging payload; using the identity key for computing one or more UWB addresses; using the hashing key for per ranging cycle cascading key derivations; or using the seeding key for per ranging cycle cascading key derivations.

Aspect 11: An apparatus for wireless communication, comprising a memory and at least one processor coupled to the memory, the memory and the at least one processor being configured to perform any of the operations of Aspects 1-10.

Aspect 12: An apparatus for wireless communication by a first device, comprising means for performing any of the operations of Aspects 1-10.

Aspect 13: A computer readable medium having instructions stored thereon for performing any of the operations of Aspects 1-10.

Additional Considerations

The description provides examples of secure digital key derivation, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for digital key (DK) applications involving secure ultra-wideband (UWB) ranging sessions. In some cases, such techniques may be implemented in devices (e.g., UEs) also used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

In NR, the transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A sub-slot structure may refer to a transmit time interval having a duration less than a slot (e.g., 2, 3, or 4 symbols). Each symbol in a slot may be configured for a link direction (e.g., downlink (DL), uplink (UL), or flexible) for data transmission and the link direction for each subframe may be dynamically switched. The link directions may be based on the slot format. Each slot may include DL/UL data as well as DL/UL control information.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c"

is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, the various processor shown in FIG. 2 may be configured to perform operations 400 of FIG. 4.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a UE 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein (e.g., instructions for performing the operations described herein and illustrated in FIG. 4).

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for wireless communications by a user equipment (UE), the method comprising:
   maintaining an ultra-wideband (UWB) secret ranging key (URSK) in a secure element (SE) at the UE, wherein the URSK is maintained only in the SE and not allowed to be fetched from the SE;
   fetching, from the SE, by a UWB module that manages a ranging session for the UE, one or more other keys derived from the URSK; and
   using the one or more other keys to secure the ranging session between the UE and a second device.

2. The method of claim 1, wherein the second device comprises a vehicle.

3. The method of claim 1, wherein the one or more other keys are used to establish an authenticated link between the UE and the second device.

4. The method of claim 1, further comprising:
   fetching, by the UWB module, a salt value computed by the SE; and
   calculating a salted hash key based on the salt value fetched from the SE.

5. The method of claim 4, further comprising fetching, from the SE, one or more new keys and a new salt for each new ranging session.

6. The method of claim 1, further comprising deriving, at the UWB module, a UWB address based on one of the fetched one or more others keys and a reference scrambled timestamp sequence (STS) index.

7. The method of claim 1, further comprising using, at the UWB module, one of the fetched one or more other keys to encrypt a scrambled timestamp sequence (STS) index included in each frame sent as part of the ranging session.

8. The method of claim 1, wherein the fetched one or more other keys comprise at least one of:
   an encryption key;
   an identity key;
   a hashing key;
   a seeding key; or
   a combination thereof.

9. The method of claim 8, further comprising at least one of:
   using the encryption key for securing ranging payload;
   using the identity key for computing one or more UWB addresses;
   using the hashing key for per ranging cycle cascading key derivations; or
   using the seeding key for per ranging cycle cascading key derivations.

10. A user equipment (UE), comprising:
    a secure element (SE) configured to:
       maintain an ultra-wideband (UWB) secret ranging key (URSK), wherein the URSK is maintained only in the SE and not allowed to be fetched from the SE; and
       derive one or more other keys from the URSK; and
    UWB circuitry configured to:
       fetch the one or more other keys from the SE; and
       use the one or more other keys to secure a ranging session between the UE and another apparatus.

11. The apparatus of claim 10, wherein the other apparatus comprises a vehicle.

12. The apparatus of claim 10, wherein the UWB circuitry is configured to use the one or more other keys to establish an authenticated link between the UE and the other apparatus.

13. The apparatus of claim 10, wherein the UWB circuitry is further configured to:
    fetch a salt value computed by the SE; and
    calculate a salted hash key based on the salt value fetched from the SE.

14. The apparatus of claim 13, wherein the UWB circuitry is further configured to fetch, from the SE, one or more new keys and a new salt for each new ranging session.

15. The apparatus of claim 10, wherein the UWB circuitry is further configured to derive a UWB address based on one of the fetched one or more others keys and a reference scrambled timestamp sequence (STS) index.

16. The apparatus of claim 10, wherein the UWB circuitry is further configured to use one of the fetched one or more other keys to encrypt a scrambled timestamp sequence (STS) index included in each frame sent as part of the ranging session.

17. The apparatus of claim 10, wherein the fetched one or more other keys comprise at least one of:
    an encryption key;
    an identity key;
    a hashing key;
    a seeding key; or
    a combination thereof.

18. The apparatus of claim 17, wherein the UWB circuitry is further configured to:
    use the encryption key for securing ranging payload;
    use the identity key for computing one or more UWB addresses;
    use the hashing key for per ranging cycle cascading key derivations; or
    use the seeding key for per ranging cycle cascading key derivations.

19. An apparatus for wireless communications by a user equipment (UE), the apparatus comprising:
    means for maintaining an ultra-wideband (UWB) secret ranging key (URSK) in a secure element (SE) at the UE, wherein the URSK is maintained only in the SE and not allowed to be fetched from the SE;
    means for fetching, from the SE, by a UWB module that manages the ranging session for the UE, one or more other keys derived from the URSK; and
    means for using the one or more other keys to secure the ranging session between the UE and a second device.

20. The apparatus of claim 19, wherein the second device comprises a vehicle.

21. The apparatus of claim 19, wherein the one or more other keys are used to establish an authenticated link between the UE and the second device.

22. The apparatus of claim 19, further comprising:
    means for fetching, by the UWB module, a salt value computed by the SE; and
    means for calculating a salted hash key based on the salt value fetched from the SE.

23. The apparatus of claim 22, further comprising means for fetching, from the SE, one or more new keys and a new salt for each new ranging session.

24. The apparatus of claim 19, further comprising means for deriving, at the UWB module, a UWB address based on one of the fetched one or more others keys and a reference scrambled timestamp sequence (STS) index.

25. The apparatus of claim 19, further comprising means for using, at the UWB module, one of the fetched one or more other keys to encrypt a scrambled timestamp sequence (STS) index included in each frame sent as part of the ranging session.

26. The apparatus of claim 19, wherein the fetched one or more other keys comprise at least one of:
    an encryption key;
    an identity key;
    a hashing key;
    a seeding key; or
    a combination thereof.

27. A non-transitory computer readable medium having instructions stored thereon for:
    maintaining an ultra-wideband (UWB) secret ranging key (URSK) in a secure element (SE) at a user equipment (UE), wherein the URSK is maintained only in the SE and not allowed to be fetched from the SE;
    fetching, from the SE, by a UWB module that manages a ranging session for the UE, one or more other keys derived from the URSK; and
    using the one or more other keys to secure the ranging session between the UE and a second device.

\* \* \* \* \*